US009137009B1

(12) United States Patent
Gardiner

(10) Patent No.: US 9,137,009 B1
(45) Date of Patent: Sep. 15, 2015

(54) PORTABLE KEYING DEVICE AND METHOD

(75) Inventor: Robert C. Gardiner, Fayetteville, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 661 days.

(21) Appl. No.: 12/082,079

(22) Filed: Apr. 8, 2008

Related U.S. Application Data

(62) Division of application No. 09/854,756, filed on May 14, 2001, now Pat. No. 7,376,234.

(51) Int. Cl.
*H04L 9/08* (2006.01)

(52) U.S. Cl.
CPC ............... *H04L 9/08* (2013.01); *H04L 9/0891* (2013.01)

(58) Field of Classification Search
CPC .............................. H04L 9/08; H04L 9/0891
USPC ........................................... 726/5, 9; 380/273
See application file for complete search history.

(56) References Cited

U.S. PATENT DOCUMENTS

| 4,059,831 A | 11/1977 | Epstein |
| 4,484,160 A | 11/1984 | Riha et al. |
| 4,527,204 A | 7/1985 | Kozakai et al. |
| 4,604,623 A | 8/1986 | Skeie |
| 4,605,929 A | 8/1986 | Skeie |
| 4,620,191 A | 10/1986 | Skeie |
| 4,623,890 A | 11/1986 | Nysen |
| 4,625,207 A | 11/1986 | Skeie |
| 4,625,208 A | 11/1986 | Skeie et al. |
| 4,703,327 A | 10/1987 | Rossetti et al. |
| 4,724,443 A | 2/1988 | Nysen |
| 4,725,841 A | 2/1988 | Nysen et al. |
| 4,734,698 A | 3/1988 | Nysen et al. |
| 4,737,789 A | 4/1988 | Nysen |
| 4,737,790 A | 4/1988 | Skeie et al. |
| 4,951,057 A | 8/1990 | Nagel |
| 5,095,240 A | 3/1992 | Nysen et al. |
| 5,113,438 A | 5/1992 | Blokker, Jr. et al. |
| 5,182,570 A | 1/1993 | Nysen et al. |
| 5,351,969 A | 10/1994 | Smith, III et al. |
| 5,378,880 A | 1/1995 | Eberhardt |
| 5,379,404 A * | 1/1995 | Rasor ......................... 379/93.29 |
| 5,457,448 A | 10/1995 | Totsuka et al. |
| 5,481,610 A * | 1/1996 | Doiron et al. ................. 380/270 |
| 5,521,369 A | 5/1996 | Kumar |
| 5,619,572 A * | 4/1997 | Sowa ............................ 380/273 |
| 5,621,199 A | 4/1997 | Calari et al. |
| 5,703,347 A | 12/1997 | Reddersen et al. |
| 5,774,172 A | 6/1998 | Kapell et al. |
| 5,887,063 A | 3/1999 | Varadharajan et al. |
| 5,902,991 A | 5/1999 | Kumar |
| 5,926,168 A | 7/1999 | Fan |
| 5,963,132 A | 10/1999 | Yoakum |

(Continued)

*Primary Examiner* — Ellen Tran

(74) *Attorney, Agent, or Firm* — Additon, Higgins & Pendleton, P.A.

(57) ABSTRACT

A portable encryption key installation system is disclosed that includes a portable keying device for installing a data communications encryption key in an electronic terminal. The portable keying device securely reprograms the encryption key in the electronic terminal without having to remove the terminal from its shipping container or ship the electronic terminal offsite. Furthermore, the portable keying device securely reprograms the encryption key in the electronic terminal without having to dismantle the terminal, deactivate any anti-tampering features, or re-bond the terminal.

31 Claims, 8 Drawing Sheets

(56) References Cited

U.S. PATENT DOCUMENTS

| | | | |
|---|---|---|---|
| 5,986,562 A | 11/1999 | Nikolich | |
| 6,026,165 A * | 2/2000 | Marino et al. | 380/273 |
| 6,078,791 A | 6/2000 | Tuttle et al. | |
| 6,094,239 A | 7/2000 | Weber | |
| 6,097,301 A | 8/2000 | Tuttle | |
| 6,175,922 B1 * | 1/2001 | Wang | 713/182 |
| 6,185,307 B1 | 2/2001 | Johnson, Jr. | |
| 6,212,280 B1 | 4/2001 | Howard, Jr. et al. | |
| 6,226,749 B1 | 5/2001 | Carloganu et al. | |
| 6,232,870 B1 | 5/2001 | Garber et al. | |
| 6,264,106 B1 | 7/2001 | Bridgelall | |
| 6,293,467 B1 | 9/2001 | Reddersen et al. | |
| 6,307,517 B1 | 10/2001 | Lee | |
| 6,318,636 B1 | 11/2001 | Reynolds et al. | |
| 6,329,920 B1 | 12/2001 | Morrison et al. | |
| 6,415,144 B1 * | 7/2002 | Findikli et al. | 455/419 |
| 6,433,671 B1 * | 8/2002 | Nysen | 340/10.41 |
| 6,553,348 B1 | 4/2003 | Hashimoto et al. | |
| 6,611,194 B1 | 8/2003 | Vieweg et al. | |
| 6,684,334 B1 | 1/2004 | Abraham | |
| 6,711,263 B1 * | 3/2004 | Nordenstam et al. | 380/282 |
| 6,859,537 B1 | 2/2005 | Houlberg et al. | |
| 6,898,299 B1 * | 5/2005 | Brooks | 382/115 |
| 2001/0008390 A1 | 7/2001 | Berquist et al. | |
| 2001/0042786 A1 | 11/2001 | Reynolds et al. | |
| 2001/0045460 A1 | 11/2001 | Reynolds et al. | |

* cited by examiner

PORTABLE KEYING DEVICE AND METHOD

CROSS REFERENCE TO RELATED APPLICATIONS

This application is a divisional application of U.S. patent application Ser. No. 09/854,756 filed May 14, 2001 entitled, "Portable Keying Device And Method." The priority of the above application is claimed and is incorporated herein by reference in its entirety.

FIELD OF THE INVENTION

The present invention relates generally to transaction terminals, and particularly to the installation of security keys in transaction terminals.

BACKGROUND OF THE INVENTION

Electronic terminals such as point of sale (POS) terminals are becoming ubiquitous in our society. These terminals include credit, debit, and check authorization capabilities. Some of these devices are used as stand alone devices and some are networked using LAN technology. Because of the sensitive financial information being transmitted and received by these electronic terminals, security is a critical issue. In order to provide security, electronic terminals employ data encryption. Encryption devices scramble readable data to produce cipher text. Most of the terminals use an encryption key as part of the encryption process. An encryption key is a block of data that is combined with the readable input data to produce the cipher text. For example, the encryption key and the input data can be combined using an exclusive OR function. On the other hand, the Data Encryption Standard (DES) algorithm is often used to combine an encryption key with input data to produce the cipher text. The DES algorithm employs a 56 bit encryption key to produce the cipher text. The use of an encryption key is considered to be more secure than scrambling the input data.

Another security issue relates to tamper protection. Typically, all secure information such as encryption keys are stored in SRAM or PROM. In one approach, if the processor detects a downloading operation that may result in security information being compromised, the processor deletes the security information.

In another approach, tamper detection switches are employed to prevent physical tampering of the terminal. If the top enclosure of the terminal is separated from the main printed circuit board, or if the "trap door" is opened in the bottom of the enclosure, the detection switches are thrown. The operating system of the terminal is programmed to erase the security information in response to the signals received from the switches. In another approach, ultrasonic bonding is often used to provide evidence that someone attempted to open the terminal device.

While the above described methods are effective in terms of preventing or monitoring tampering, there are problems associated with these methods. Under certain circumstances the security information loaded into the electronic terminal must be changed or updated. Oftentimes it is desirable to change the security information loaded into the electronic terminal at the factory before the first use. At this point, the terminal must be shipped to the factory or to a servicing organization to be reprogrammed. Subsequently, the terminal is unboxed, the anti-tampering features are deactivated, the security information is reloaded, the terminal re-bonded and the terminal is repackaged. These steps are inefficient, time consuming and costly.

What is needed is a method of securely reprogramming the security information in an electronic terminal without having to remove the terminal from its shipping container, dismantle the terminal, deactivate the anti-tampering features, reload the security information, and re-bond the terminal. Further, what is needed is a method of securely reprogramming the security information in an electronic terminal without having to ship the terminal off site.

SUMMARY OF THE INVENTION

A portable encryption key installation system is disclosed that includes a portable keying device for installing a data communications encryption key in an electronic terminal.

DETAILED DESCRIPTION OF THE INVENTION

Figure 1:
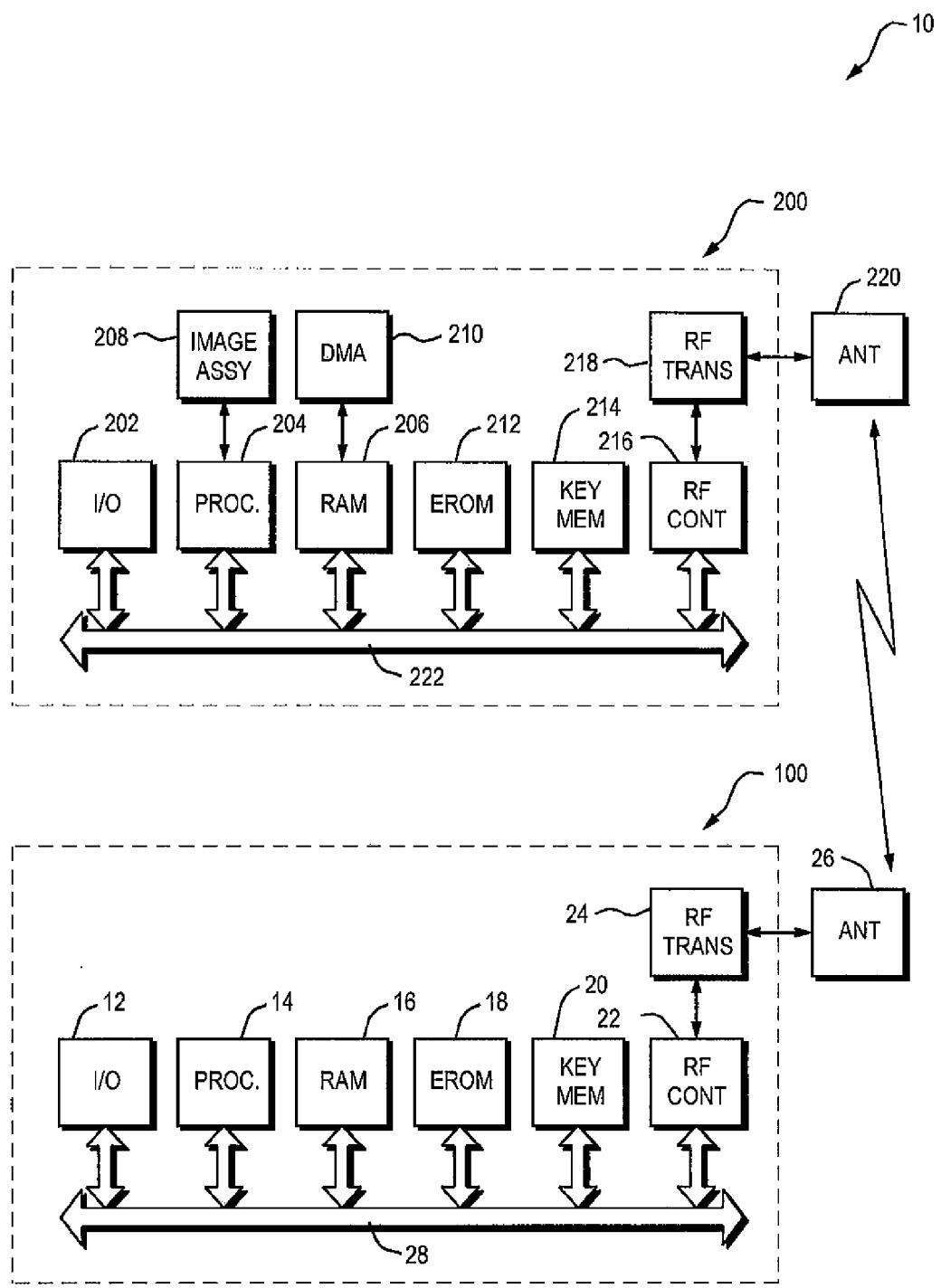
FIG. 1 is a diagrammatic depiction of a portable key installation system in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the portable key installation system of the present invention is shown in FIG. 1, and is designated generally throughout by reference numeral 10.

In accordance with the invention, the present invention for a portable key installation system includes a portable keying device for installing a data communications encryption key in an electronic terminal. The electronic terminal including a secure encryption key memory location for storing the at least one data communications encryption key. The portable keying device includes a memory for storing the at least one data communications encryption key. A processor that is operative to generate a secure installation message, the secure installation message including the at least one data communications encryption key. A communications unit is coupled to the processor. The communications unit is operative to transmit the installation message in a predetermined format to the electronic terminal.

Thus, the present invention provides a system and method for securely reprogramming the security information in an electronic terminal without having to ship the electronic terminal off site. The present invention provides a system and method for securely reprogramming the security information in an electronic terminal without having to remove the electronic terminal from its shipping container, dismantle the terminal, deactivate the anti-tampering features, reload the security information, and re-bond the terminal.

As embodied herein, and depicted in FIG. 1 a diagrammatic depiction of a portable key installation system in accordance with one embodiment of the present invention is disclosed. System 10 includes portable keying device 100 and electronic terminal 200.

Portable keying device 100 includes I/O circuit 12, processor 14, RAM 16, EROM 18, key memory 20 and RF controller 22 coupled by way of system bus 28. RF controller 22 is connected to RF transceiver 24. RF transceiver 24 is connected to antenna 26. In one embodiment, I/O circuit 12 is coupled to a keypad which is used to input the encryption key. In yet another embodiment, an initial key download is performed via the keypad or the external device. Subsequently, processor 14 uses the initial key to generate encryption keys for a plurality of devices by running a secure key generation algorithm.

It will be apparent to those of ordinary skill in the pertinent art that modifications and variations can be made to processor 14 of the present invention depending on cost and programming considerations. For example, in one embodiment processor 14 is implemented using an 8 bit "programmable system-on-a-chip" device, of the type manufactured by Cypress Semiconductor. One of ordinary skill in the art will recognize that 16 bit and 32 bit devices can also be used, in addition to other 8 bit devices.

It will be apparent to those of ordinary skill in the pertinent art that modifications and variations can be made to EROM 18 and key memory 20 of the present invention depending on cost, security, and re-programmability considerations. In one embodiment key memory 20 is actually a memory location within EROM 18. For example, in the 8 bit micro-controller embodiment, EROM 18 and key memory 20 are implemented using 32 kbytes of embedded ROM. RAM 16 is implemented using 1 kbyte of embedded RAM. In another embodiment, key memory 20 is implemented using a separate memory device. In general key memory 20 is implemented using non-volatile memory such as $E^2PROM$, Flash EPROM, battery backed RAM, or Ferro RAM (FRAM). Re-programmability is an issue in the keying device because the device is reusable to reprogram any number of terminals 200.

It will be apparent to those of ordinary skill in the pertinent art that modifications and variations can be made to RF controller 216, RF transceiver 218, and antenna 220 of the present invention depending on cost and implementation considerations. For example, in FIG. 1 and FIG. 2, a low power/close proximity RF system is depicted. In this embodiment, transceiver 24 outputs approximately 1 milliwatt and has an effective range of about 1 meter of less. In another embodiment, the RF components are replaced altogether by an infrared optical communications system. In yet another embodiment, the RF components are replaced by an audio communications system that employs DTMF technology.

Referring back to FIG. 1, any type of electronic terminal 200 can be employed in system 10 of the present invention. In one embodiment, electronic terminal 200 is a simple hard wired terminal. In other embodiments, terminal 200 is a keypad, signature pad, card reader, bar code reader, or a POS retail transaction terminal. In yet another embodiment, electronic terminal 200 is a stand alone unit. In an alternate embodiment, electronic terminal 200 is networked to a LAN. In the example depicted in FIG. 1, electronic terminal 200 includes I/O circuit 202, processor 204, RAM 206, EROM 208, key memory 214 and RF controller 216 coupled by way of system bus 222. In this example, terminal 200 includes imaging assembly 208 for image scanning purposes. Image assembly 208 is controlled by processor 204. Imaging data generated by image assembly 208 is written into RAM 206 by way of DMA channel 210. RF controller 216 is connected to RF transceiver 218. RF transceiver 218 is connected to antenna 220.

In another embodiment, processor 204 includes a general purpose processor and an additional processor to handle secure information including the encryption key. In this embodiment, the additional processor is programmed to handle I/O functions involving a keypad and display. Key memory 214 is embedded in the security processor.

It will be apparent to those of ordinary skill in the pertinent art that modifications and variations can be made to key memory 214 of the present invention depending on cost, security, and re-programmability considerations. In one embodiment key memory 214 is actually a memory location within EROM 18. In another embodiment, key memory 214 is implemented using a separate memory device. In general key memory 214 is implemented using non-volatile memory such as $E^2PROM$, Flash EPROM, battery backed SRAM, or Ferro RAM (FRAM). One of the re-programmability considerations relates to the programming voltage required by key memory 214. Some memory devices require an additional programming voltage, over and above the normal system operating voltage, before being enabled to reprogram the contents of the memory.

With respect to the other components of terminal 200 depicted in FIG. 1, modifications and variations are dependent on the type and complexity of terminal 200. Further, the communications components are dependent on the type of communications components present in portable keying device 100.

Figure 2:
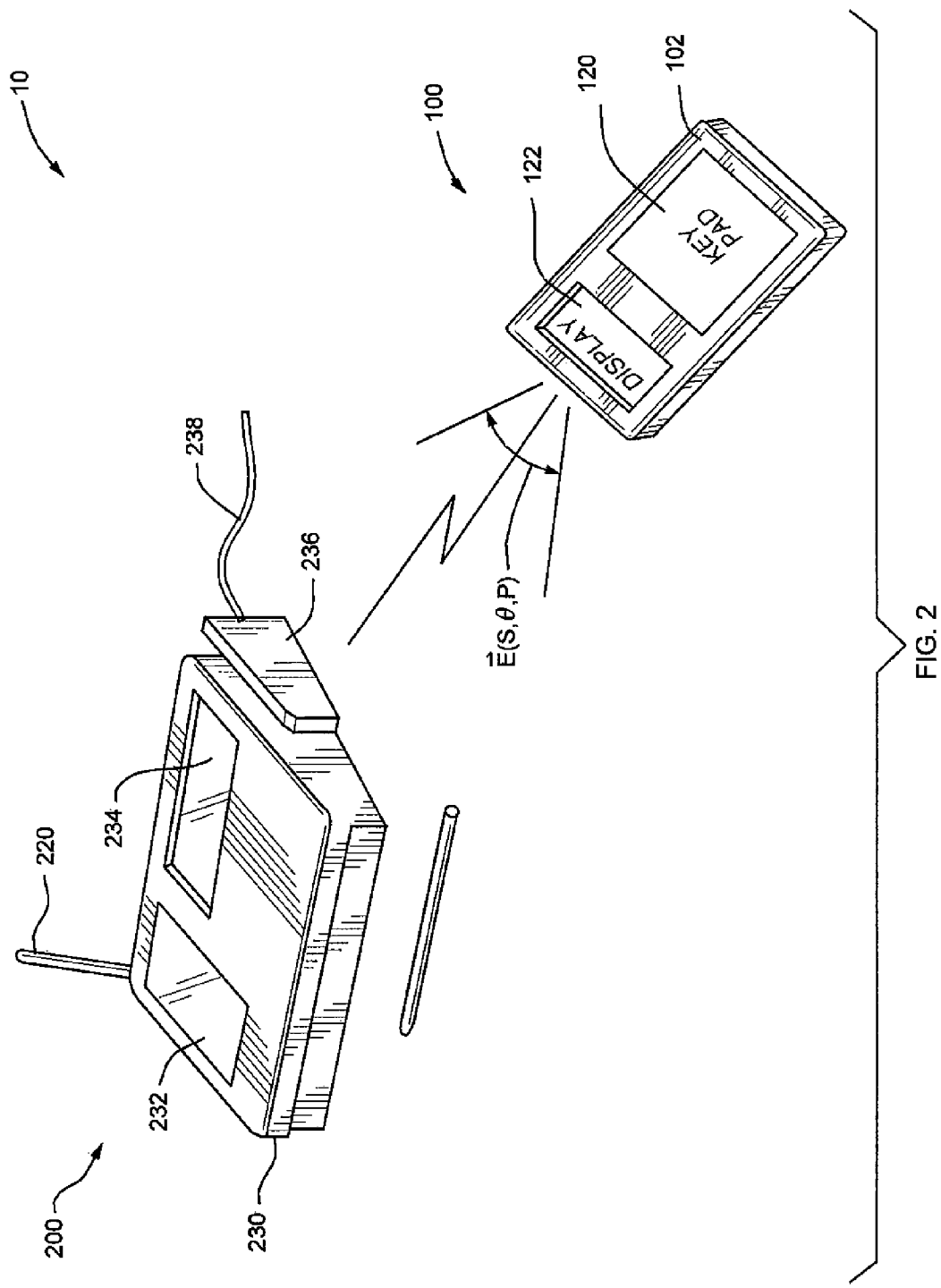
FIG. 2 is a perspective view of a portable key installation system depicted in FIG. 1.

As embodied herein, and depicted in FIG. 2, a perspective view of the portable key installation system depicted in FIG. 1 is disclosed. Electronic terminal 200 includes housing 230, which accommodates keypad 232, display 234, card reader 236, cable 238 and antenna 220. As discussed above, terminal 200 can be a stand alone terminal or a networked device. Portable keying device 100 includes housing 102, keypad 120 and liquid crystal display 122. FIG. 2 illustrates a secure communications protocol that avoids accidental erasure or reprogramming of the encryption key stored in key memory 214. In this embodiment, additional security is provided by keying system 10 by employing RF components that include proximity features. The proximity features include power level S, angular directivity θ, and polarity P. Of course, the effective range of keying device 10 is a function of the power. If, for example, portable keying device 100 is not within 1 meter, and is not pointing at antenna 220 (within, e.g., 15°), and does not emit an RF signal having a polarity that is matched to the RF system in terminal 200, the re-programming attempt will be unsuccessful.

Figure 3:
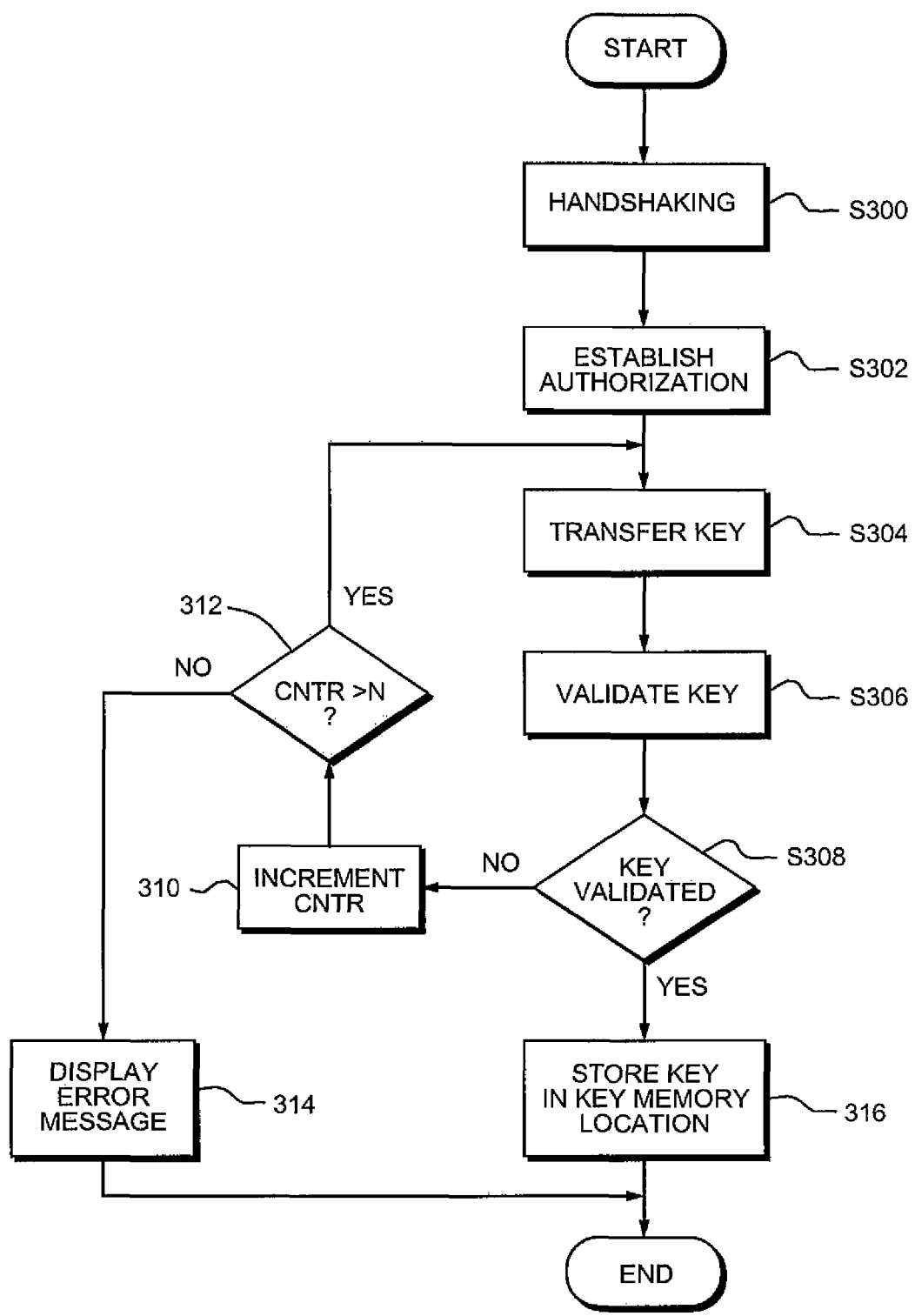
FIG. 3 is a chart showing a method for installing a security key in an electronic terminal using a portable device.

As embodied herein, and depicted in FIG. 3, a chart showing a method for installing a security key in an electronic terminal using a portable device is disclosed. In step S300, portable device 100 and electronic terminal exchange handshaking messages. First, portable device 100 must satisfy the distance, angular directivity, and polarity requirements discussed above. Second, portable device 100 and electronic terminal 200 exchange authentication codes. Subsequently, in step S302, portable device 100 transmits an authorization code to electronic terminal 200. The transmitted authorization code must match the authorization code stored in EROM 212 of terminal 200. If the authorization codes match, portable device 100 transmits an installation message in step S304. The installation message includes the encryption key to be installed. In step S306, terminal 200 retransmits the encryption key to portable device 100. Portable device 100 validates the key by comparing the key that it received from terminal 200 in step S306 with the key it sent to terminal 200 in step S304. If the two keys do not match, portable device 100 performs step S304 over again. As shown in steps S308-S314, device 100 displays an error message to the user after several unsuccessful attempts, indicating that a successful transfer of the key could not be performed. If the key is validated in step S306, processor 204 writes the encryption key into secure key memory 214 in step S316.

In an alternate embodiment, step S306 includes additional steps. Portable device 100 transmits a test encryption key that it believes is currently being stored in key memory 214. If the test encryption key matches the current encryption key, terminal 200 transmits an acknowledgment signal. If the keys do not match, the installation procedure is aborted. Upon receiving the acknowledgment signal, portable device 100 transmits the new encryption key to terminal 200. If the new key is validated in step S306, processor 204 writes the encryption key into secure key memory 214, and the procedure is complete.

Figure 4:
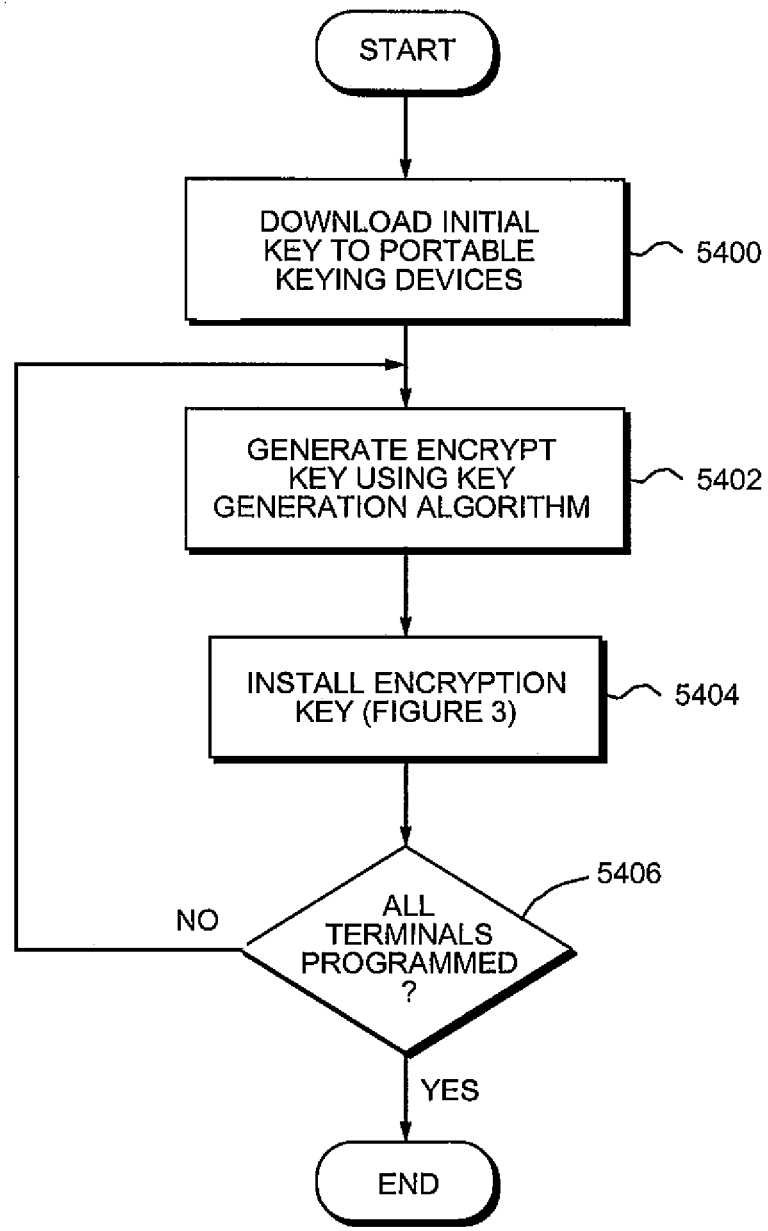
FIG. 4 is a chart showing a method for installing security keys in a plurality of electronic terminals using the portable device.

As embodied herein and depicted in FIG. 4, a chart showing a method for installing security keys in a plurality of electronic terminals is disclosed. As shown in step S400, an initial key is downloaded into memory 16 of portable keying device 100. This step can be performed using keypad 120, or performed electronically using an external computer, or some other such device. Processor 14 uses the initial key to generate encryption keys for a plurality of devices by running a secure key generation algorithm. In step S402, the algorithm is used to generate one encryption key. In step S 404, the method depicted in FIG. 3 is employed to install the encryption key in the first terminal. If there are additional terminals to be programmed, steps S402-S406 are repeated until encryption keys are installed in all of the terminals 200.

Figure 5A:
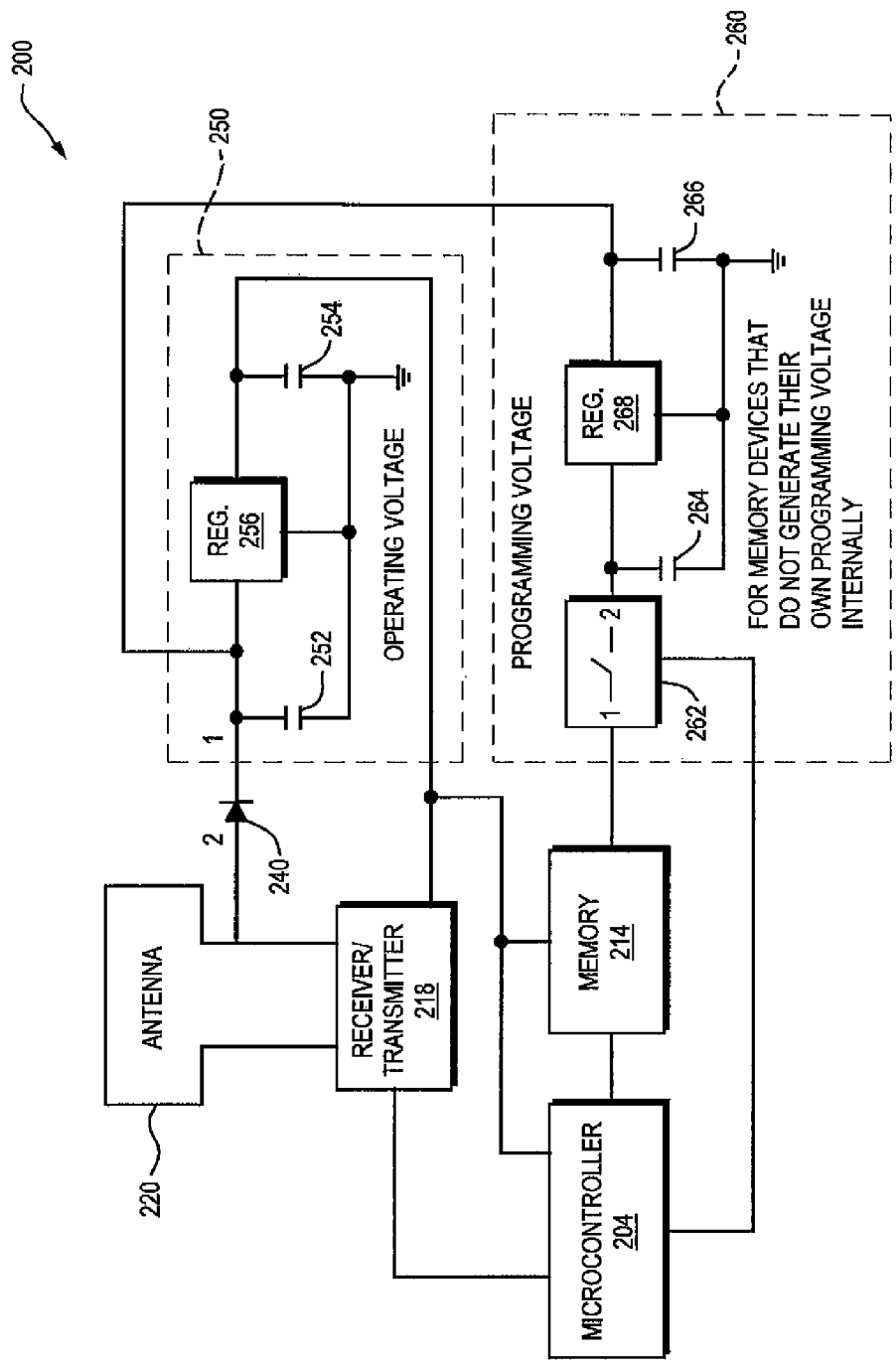
FIGS. 5A and 5B are diagrammatic depictions of an electronic terminal in accordance with a second embodiment of the present invention.
Figure 5B:
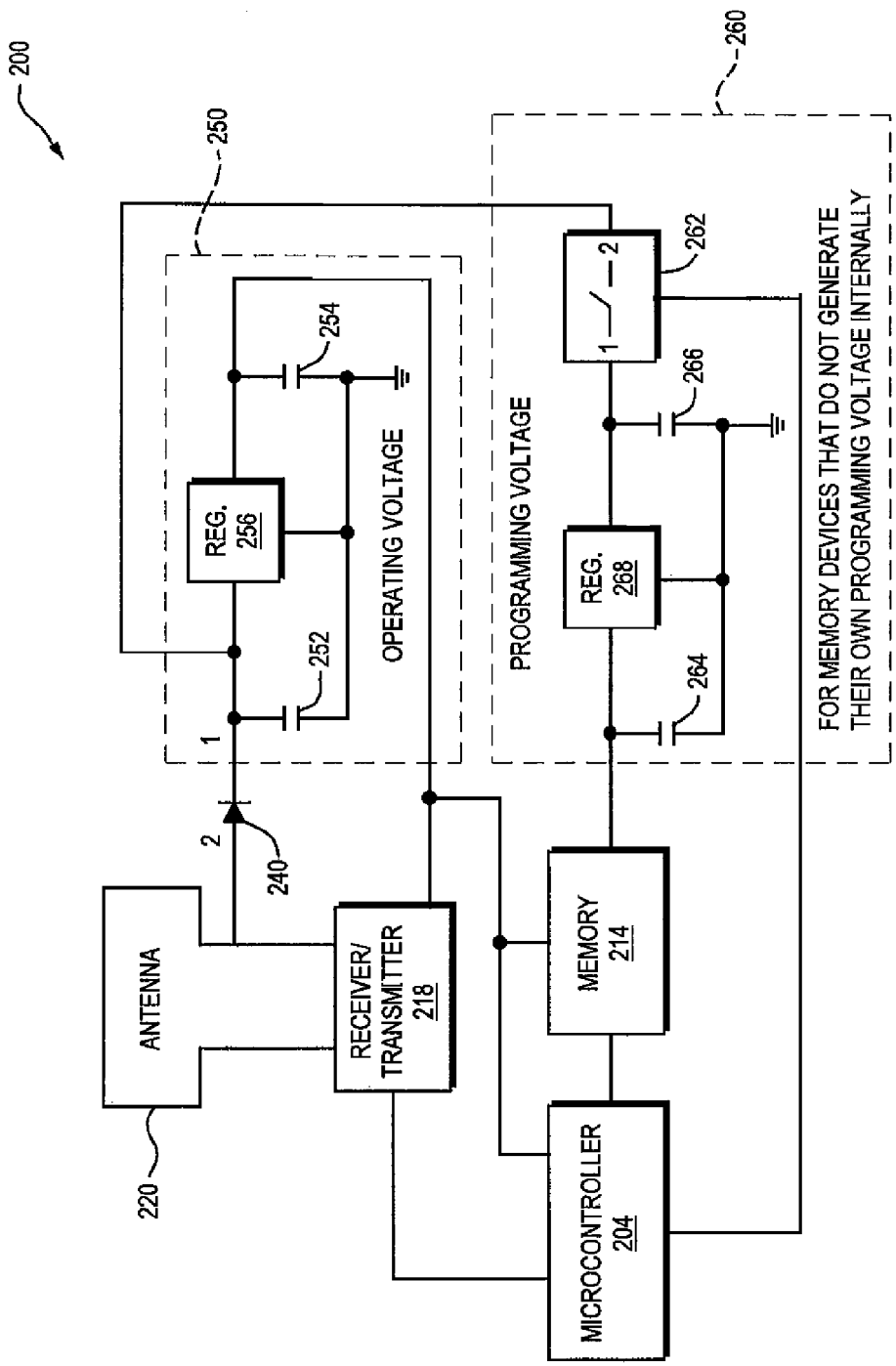

As embodied herein, and depicted in FIG. 5A, a diagrammatic depiction of electronic terminal 200 in accordance with a second embodiment of the present invention is disclosed. In this embodiment, key memory 214 requires an external programming voltage. As described above, terminal 200 includes processor 204, key memory 214, transceiver 218 and antenna 220. In this example it is assumed that terminal 200 is boxed in a shipping container of some sort. Thus, terminal 200 is not connected to any external power supply. However, terminal 200 includes diode 240, normal operating voltage supply 250 and programming voltage supply 260. Normal operating voltage supply 250 includes capacitor 252, capacitor 254, and voltage regulator 256. Programming operating voltage supply 260 includes capacitor 262, capacitor 264, and voltage regulator 266. When portable device 100 transmits an RF signal to terminal 200, diode 240 rectifies the AC-RF signal and prevents any return signal from damaging the RF components. The resultant DC signal is used to charge up capacitors 252, 254, 262 and 264. Voltage regulator 256 ensures that the power supplied to terminal 200 is within system operating parameters. Voltage regulator 266 ensures that memory 214 receives an acceptable programming voltage. In response to the normal operating voltage supplied by supply 250, terminal 200 is energized and ready for key installation. At the proper time, e.g. during step S308 (See FIG. 3), processor 204 activates switch 262 and supply 260 provides memory 214 with the programming voltage required to store the new encryption key therein. FIG. 5B is an alternative embodiment of FIG. 5A. In the alternative embodiment, switch 262 is connected to the output of normal operating voltage supply 250 instead of being connected to the input of key memory 214 as in FIG. 5A. Functionally, there is very little difference between the two alternative embodiments.

Figure 6:
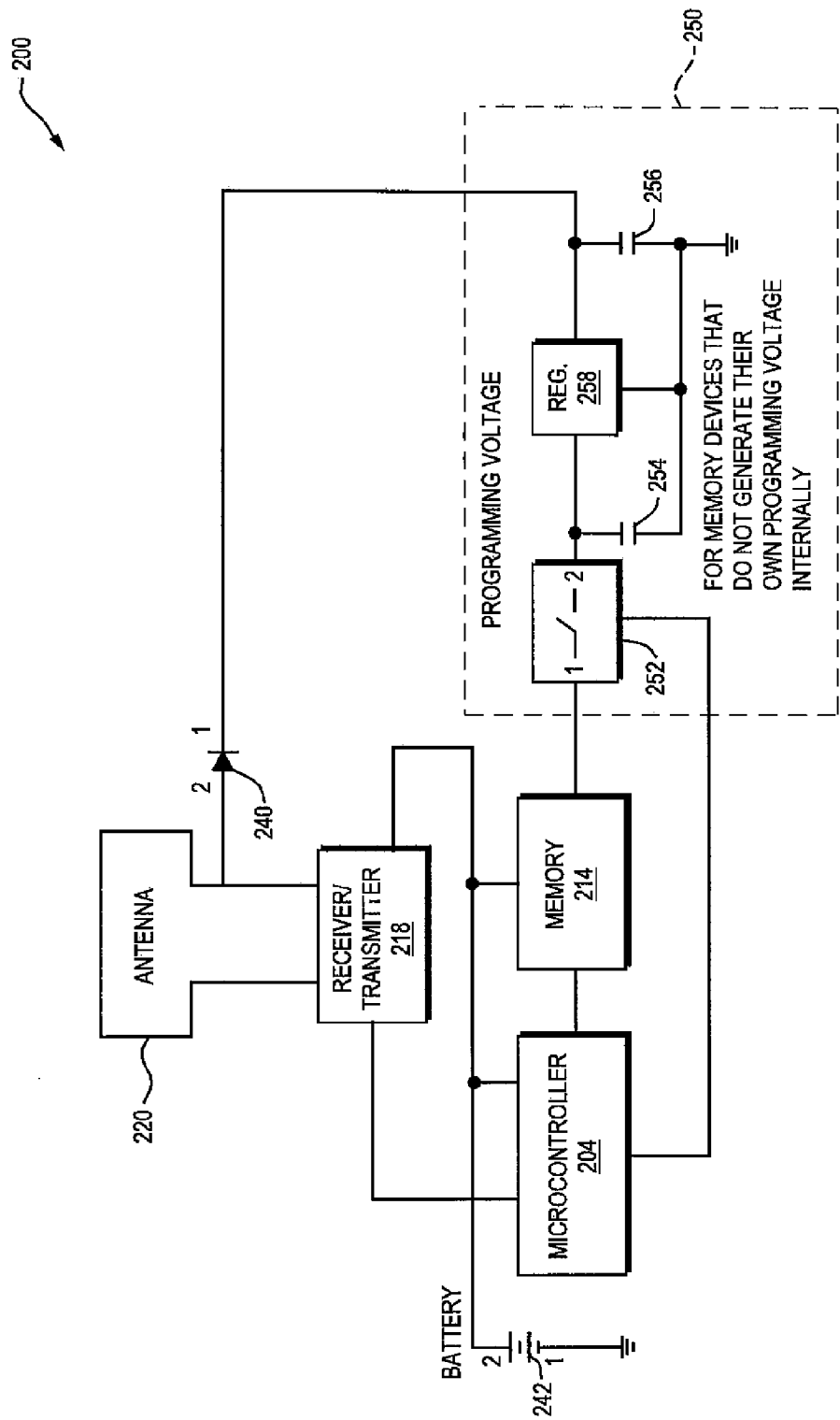
FIG. 6 is a diagrammatic depiction of an electronic terminal in accordance with a third embodiment of the present invention.

As embodied herein, and depicted in FIG. 6, a diagrammatic depiction of an electronic terminal in accordance with a third embodiment of the present invention is disclosed. In this embodiment, battery 242 is included within terminal 200 to provide a normal operating voltage. Diode 240 is included to rectify the RF signal and prevent any return signals from damaging the RF components. Programming operating voltage supply 250 is included to provide programming voltage to key memory 214. Programming operating voltage supply 250 includes capacitor 254, capacitor 256, and voltage regulator 258. When portable device 100 transmits an RF signal to terminal 200, diode 240 rectifies the AC-RF signal. The resultant DC signal is used to charge up capacitors 254 and 256. Again, at the proper time, e.g. during step S308 (See FIG. 3), processor 204 activates switch 252 and supply 250 provides memory 214 with the programming voltage required to store the new encryption key therein.

Figure 7:
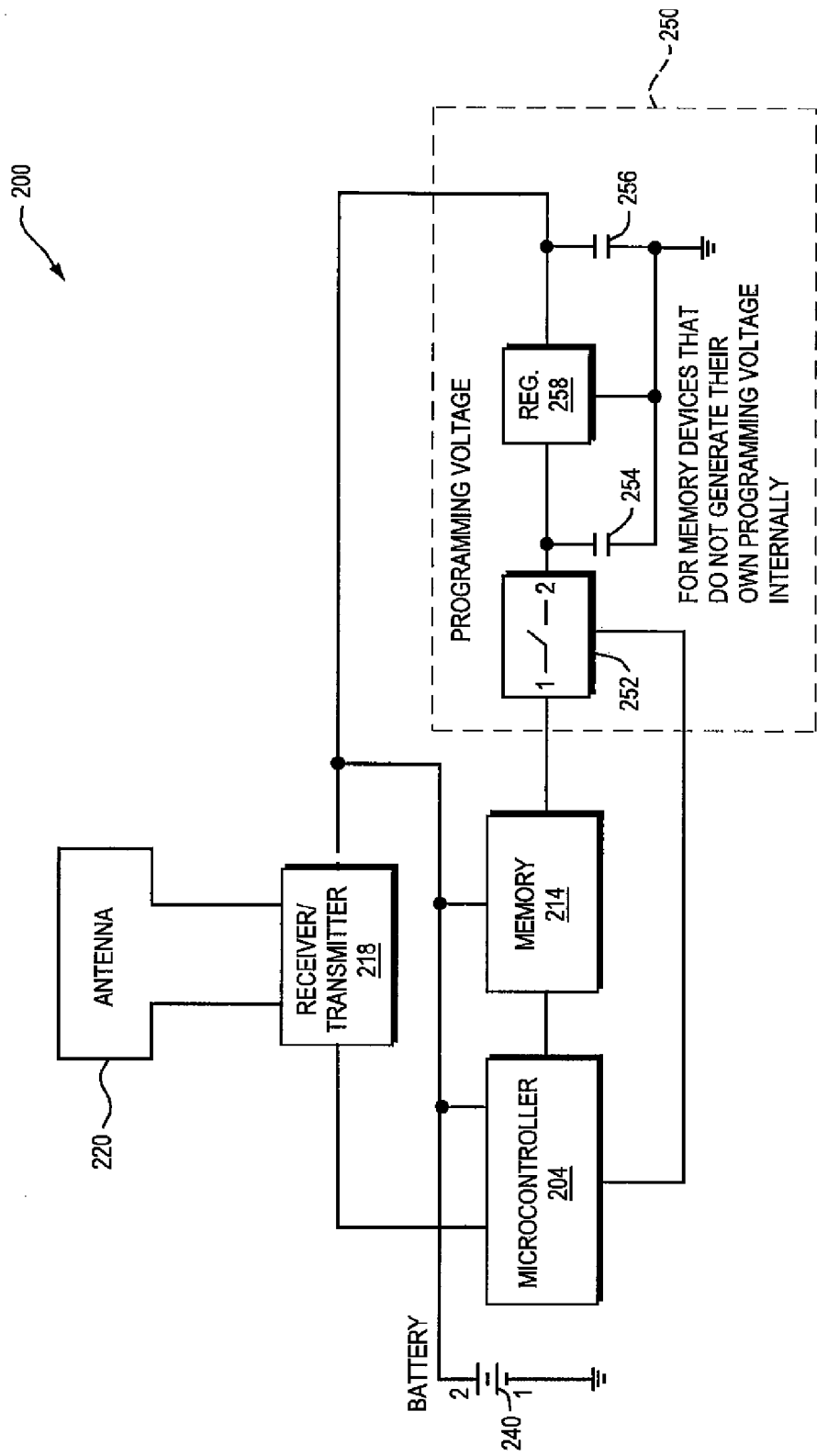
FIG. 7 is a diagrammatic depiction of an electronic terminal in accordance with a fourth embodiment of the present invention.

As embodied herein, and depicted in FIG. 7, a diagrammatic depiction of an electronic terminal in accordance with a fourth embodiment of the present invention is disclosed. In this embodiment, the required programming voltage is supplied internally. Battery 240 is included within terminal 200 to provide both the normal operating voltage and the programming voltage. In this embodiment battery 240 is coupled to programming voltage supply 250. Programming voltage supply 250 is identical to those depicted in FIG. 5A, FIG. 5B and FIG. 6. Since battery 240 supplies DC voltage to capacitors 254 and 256, no rectifying diode is needed. Yet again, at the proper time, e.g. during step S308 (See FIG. 3), processor 204 activates switch 252 and programming supply 250 provides memory 214 with the programming voltage required to store the new encryption key therein.

The present invention addresses the needs discussed above. The present invention provides a system and method for securely reprogramming the security information in an electronic terminal without having to ship the terminal off site. The present invention provides a system and method for securely reprogramming the security information in an electronic terminal without having to remove the terminal from its shipping container, dismantle the terminal, deactivate the anti-tampering features, reload the security information, and re-bond the terminal.

One aspect of the present invention is a portable keying device for installing a data communications encryption key in at least one electronic terminal. The electronic terminal includes a secure encryption key memory location for storing at least one data communications encryption key. The device includes a memory device for storing the at least one data communications encryption key. A communications unit is coupled to the memory device, the communications unit being operative to transmit the at least one data communications encryption key in a predetermined format to the electronic terminal.

In another aspect, the present invention includes a method for installing a data communications encryption key in an electronic terminal. The electronic terminal including a secure encryption key memory location for storing the at least one data communications encryption key. The method includes: providing a portable keying device, whereby the portable keying device is physically separated from the electronic terminal; performing a handshaking routine, whereby the keying device and the electronic terminal exchange handshaking messages; transmitting an encryption key from the portable keying device to the electronic terminal; and storing the encryption key transmitted from the portable keying device to the electronic terminal in the secure key memory location.

In yet another aspect, the present invention includes a portable key installation system for installing a data communications encryption key. The system includes at least one electronic terminal having a secure encryption key memory adapted to store the at least one data communications encryption key, and a terminal communications unit coupled to the secure encryption key memory. A portable keying device includes a memory adapted to store the at least one data communications encryption key, and a device communications unit coupled to the memory device, the device communications unit being adapted to bi-directionally communicate the at least one data communications encryption key in a predetermined format to the terminal communications unit.

Additional features and advantages of the invention are set forth in the detailed description herein, and in part will be readily apparent to those skilled in the art from that description or recognized by practicing the invention as described herein, including the detailed description which follows, the claims, as well as the appended drawings.

It is to be understood that the descriptions herein are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

There is described herein (A1) A portable keying device for installing a data communications encryption key in at least one electronic terminal, the electronic terminal including a secure encryption key memory location for storing at least one data communications encryption key, the device comprising: a memory device for storing the at least one data communications encryption key; and a communications unit coupled to the memory device, the communications unit being operative to transmit the at least one data communications encryption key in a predetermined format to the electronic terminal. There is also described (A2) The device of A1, wherein the communications unit includes a low power close proximity RF transceiver. There is also described (A3) The device of A2, wherein the predetermined format includes transmitting an RF signal at a predetermined power level. There is also described (A4) The device of A3, wherein the predetermined power level is less than or equal to 1 mW. There is also described (A5) The device of A3, wherein the RF signal has an effective range of less than or equal to a meter. There is also described (A6) The device of A2, wherein the predetermined format includes transmitting an RF signal in a predetermined direction. There is also described (A7) The device of A2, wherein the predetermined format includes transmitting an RF signal having a predetermined polarity. There is also described (A8) The device of A1, wherein the at least one data communications encryption key is installed in the electronic terminal in accordance with a predetermined protocol. There is also described (A9) The device of A8, wherein the predetermined protocol includes: performing a handshaking routine, whereby the keying device and the electronic terminal exchange handshaking messages; transmitting the at least one data communications encryption key from the keying device to the electronic terminal in response to a successful handshaking routine; validating the step of transmitting by retransmitting the at least one data communications encryption key from the electronic terminal to the keying device, whereby the keying device compares the transmitted data communications encryption key to the retransmitted data communications encryption key; and storing the at least one data communications encryption key in the secure encryption key memory location in response to a successful step of validating. There is also described (A10) The device of A8, wherein the step of validating includes transmitting a test data communications encryption key from the keying device to the electronic terminal. There is also described (A11) The device of A10, wherein the electronic terminal compares the test data communications encryption key with a currently in-use data communications encryption key stored in the secure encryption key memory location. There is also described (A12) The device of A1, wherein the secure encryption key memory location is a memory location in non-volatile memory. There is also described (A13) The device of A12, wherein the non-volatile memory includes $E^2PROM$. There is also described (A14) The device of A12, wherein the non-volatile memory includes EPROM. There is also described (A15) The device of A12, wherein the non-volatile memory includes Flash memory. There is also described (A16) The device of A12, wherein the non-volatile memory includes battery backed RAM. There is also described (A17) The device of A12, wherein the non-volatile memory includes Ferro RAM. There is also described (A18) The device of A1, wherein the communications unit includes an optical signaling unit. There is also described (A19) The device of A18, wherein the optical signaling unit is operative to transmit infrared radiation. There is also described (A20) The device of A1, wherein the communications unit includes an audio signaling unit. There is also described (A21) The device of A20, wherein the audio signaling unit communicates using DTMF signaling. There is also described (A22) The device of A1, further comprising an I/O device for receiving an encryption key from an external source. There is also described (A23) The device of A22, wherein the I/O device includes a keypad, the keypad being adapted to enter the at least one data communications encryption key. There is also described (A24) The device of A22, wherein the I/O device includes an external device interface adapted to receive the at least one data communications encryption key from an external device. There is also described (A25) The device of A1, further comprising: an I/O device for receiving an initial encryption key from an external encryption key source; and a processor coupled to the I/O device, the processor being programmed to generate the at least one data communications encryption key from the initial encryption key using a secure key generation algorithm. There is also described (A26) The device of A25, wherein the I/O device includes a keypad, the keypad being adapted to enter the initial encryption key. There is also described (A27) The device of A25, wherein the I/O device includes an external device interface adapted to receive the initial encryption key from an external device.

There is also described (B1) A method for installing a data communications encryption key in an electronic terminal, the electronic terminal including a secure encryption key memory location for storing the at least one data communications encryption key, the method comprising: providing a portable keying device, whereby the portable keying device is physically separated from the electronic terminal; performing a handshaking routine, whereby the keying device and the electronic terminal exchange handshaking messages; transmitting an encryption key from the portable keying device to the electronic terminal; and storing the encryption key transmitted from the portable keying device to the electronic terminal in the secure key memory location. There is also described (B2) The method of B1, wherein the step of performing a handshaking routine includes transmitting an authorization signal from the portable keying device to the electronic terminal. There is also described (B3) The method of B2, wherein the portable keying device provides the electronic terminal with a predetermined authorization code during the step of transmitting an authorization signal. There is also described (B4) The method of B1, wherein the step of performing a handshaking routine includes transmitting RF signals having at least one predetermined transmission characteristic. There is also described (B5) The method of B4, wherein the at least one predetermined transmission characteristic includes transmitting an RF signal having a predetermined range. There is also described (B6) The method of B4, wherein the at least one predetermined transmission characteristic includes transmitting an RF signal in a predetermined direction. There is also described (B7) The method of B4, wherein the at least one predetermined transmission characteristic includes a transmitting an RF signal having a predetermined polarity. There is also described (B8) The method of claim B4, wherein the at least one predetermined transmission characteristic includes transmitting an RF signal having a predetermined modulation format that is characterized by a predetermined programming voltage. There is also described (B9) The method of B2, wherein the step of transmitting an encryption key further comprises: transmitting the at least one data communications encryption key from the keying device to the electronic terminal in response to a successful handshaking routine; validating the step of transmitting by retransmitting the at least one data communications encryption key from the electronic terminal to the keying device, whereby the keying device compares the transmitted data communications encryption key to the retransmitted data communications encryption key; and storing the at least one data communications encryption key in the secure encryption key memory location in response to a successful step of validating. There is also described (B10) The method of B9, wherein the step of validating includes transmitting a test data communications encryption key from the keying device to the electronic terminal before transmitting the at least one data communications encryption key. There is also described (B11) The method of B10, wherein the step of validating includes the electronic terminal comparing the test data communications encryption key with a currently in-use data communications encryption key stored in the secure encryption key memory location. There is also described (B12) The method of B1, wherein the step of performing a handshaking routine includes transmitting infrared signals having at least one predetermined transmission characteristic. There is also described (B13) The method of B1, wherein the step of performing a handshaking routine includes transmitting audio signals having at least one predetermined transmission characteristic. There is also described (B14) The method of B13, wherein the audio signals include DTMF signals.

There is also described (C1) A portable key installation system for installing a data communications encryption key, the system comprising: at least one electronic terminal having a secure encryption key memory adapted to store the at least one data communications encryption key, and a terminal communications unit coupled to the secure encryption key memory; and a portable keying device including a memory adapted to store the at least one data communications encryption key, and a device communications unit coupled to the memory device, the device communications unit being adapted to bi-directionally communicate the at least one data communications encryption key in a predetermined format to the terminal communications unit. There is also described (C2) The device of C1, wherein the terminal communications unit and the device communications unit include low power-close proximity RF transceivers. There is also described (C3) The device of C2, wherein the predetermined format includes transmitting an RF signal at a predetermined power level. There is also described (C4) The device of C3, wherein the predetermined power level is less than or equal to 1 mW. There is also described (C5) The device of C3, wherein the RF signal has an effective range of less than or equal to a meter. There is also described (C6) The device of C2, wherein the predetermined format includes transmitting an RF signal in a predetermined direction. There is also described (C7) The device of C2, wherein the predetermined format includes transmitting an RF signal having a predetermined polarity. There is also described (C8) The system of C2, wherein the at least one electronic terminal includes a programming voltage supply unit, the programming voltage supply unit being adapted to convert an RF signal transmitted by the device communications unit into programming voltage to thereby enable the secure encryption key memory to store the at least one data communications encryption key transmitted by the device communications unit. There is also described (C9) The system of C8, wherein the programming voltage supply unit comprises: at least one capacitor coupled to the RF transceiver; and a voltage regulator coupled to the at least one capacitor and the secure encryption key memory. There is also described (C10) The system of C9, wherein the at least one capacitor includes a plurality of capacitors. There is also described (C11) The system of C9, further comprising a diode disposed between the programming voltage supply unit and the RF transceiver. There is also described (C12) The system of C90, further comprising a battery coupled to the programming voltage supply unit. There is also described (C13) The system of C9, further comprising a normal voltage supply unit, the normal voltage supply unit including: at least one second capacitor coupled to the RF transceiver; and a second voltage regulator coupled to the at least one second capacitor and the secure encryption key memory. There is also described (C14) The system of C9, further comprising a switch disposed between the programming voltage supply unit and the secure encryption key memory, the programming voltage being supplied to the secure encryption key memory when the switch is closed. There is also described (C15) The system of C2, further comprising: a battery coupled to the RF transceiver of the electronic terminal; at least one capacitor coupled to the battery, the at least one capacitor being charged by the battery to generate a programming voltage, whereby the secure encryption key memory is enabled to store the at least one data communications encryption key transmitted by the device communications unit; and a voltage regulator coupled to the at least one capacitor. There is also described (C16) The system of C15, further comprising a switch disposed between the at least one capacitor and the secure encryption key memory, the programming voltage being supplied to the secure encryption key memory when the switch is closed.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

I claim:

1. An electronic terminal comprising:
   at least two memories including a secure memory for storing at least one encryption key and a read-only memory for storing at least one authorization code;
   a processor;
   an RF transceiver;
   a switch activated by the processor pursuant to pre-programmed time controls, said switch connecting said processor to a circuit for storing a new encryption key in said secure memory;
   wherein the terminal is configured, responsive to successfully comparing a first authorization code received from a client via the RF transceiver to a second authorization code stored in the read-only memory, and validating the communication from the client, to receive said new encryption key via the RF transceiver from the client to store in the secure memory,
   wherein the validating includes receiving the test encryption key via the RF transceiver and comparing the test encryption key received via the RF transceiver to the at least one encryption key stored in the secure memory and responsive to matching the test encryption key to the at least one encryption key, obtaining a new encryption key from the client via the RF transceiver, sending the new encryption key via the RF transceiver to the client, and receiving an indication of validation via the RF transceiver from the client.

2. The terminal of claim 1, wherein the terminal is selected from the group consisting of: a keypad, a signature pad, a card reader, a bar code reader, and a point-of-sale transaction terminal.

3. The terminal of claim 1, wherein the terminal is in communication with a local area network.

4. The terminal of claim 1, wherein the secure memory is implemented using a separate memory device.

5. The terminal of claim 1, wherein the RF transceiver includes one or more proximity features selected from the group consisting of: an RF signal power level, an RF signal angular directivity, and an RF signal polarity.

6. An electronic terminal according to claim 1, further comprising:
   a diode connected between said transceiver and said circuit for storing said new encryption key;
   a capacitor within said circuit for storing connected to said diode;
   an output from said transceiver connected to said diode and charging said capacitor until the timing controls trigger said switch.

7. An electronic terminal according to claim 6, further comprising a voltage regulator determining if said capacitor provides an acceptable programming voltage to send to said memory.

8. An electronic terminal according to claim 6, wherein said transceiver output and said acceptable programming voltage are coordinated by said timing controls to prevent an unacceptable programming voltage from said memory.

9. An electronic terminal comprising:
   at least two memories including a secure memory for storing at least one encryption key and a read only memory for storing an authorization code;
   a processor;
   an RF transceiver; and
   an imaging assembly for image scanning;
   a programming voltage supply unit adapted to convert an RF signal received via the RF transceiver into a programming voltage to thereby enable the secure memory to store the at least one encryption key received via the RF transceiver responsive to receiving a first authorization code via the RF transceiver and matching the first authorization code to a second authorization code stored in the read only memory.

10. The terminal of claim 9, wherein the terminal is selected from the group consisting of: a keypad, a signature pad, a card reader, a bar code reader, and a point-of-sale transaction terminal.

11. The terminal of claim 9, wherein the terminal is in communication with a local area network.

12. The terminal of claim 9, wherein the secure memory is implemented using a separate memory device.

13. The terminal of claim 9, wherein the RF transceiver includes one or more proximity features selected from the group consisting of: an RF signal power level, an RF signal angular directivity, and an RF signal polarity.

14. The terminal of claim 9, wherein the programming voltage supply unit includes a diode rectifying the RF signal to output a DC signal.

15. The terminal of claim 9, wherein the terminal is configured to store the at least one encryption key received via the RF transceiver while not being connected to an external power supply.

16. The terminal of claim 9, wherein the terminal is devoid of an internal battery.

17. The terminal of claim 1, further configured, responsive to successfully comparing a first authorization code received via the RF transceiver to a second authorization code stored in the secure memory, to transmit an acknowledgement message via the RF transceiver.

18. The terminal of claim 9, wherein the programming voltage supply unit further comprises at least one capacitor and a voltage regulator.

19. The terminal of claim 9, wherein the programming voltage supply unit further comprises a voltage regulator and a switch electrically coupled to the voltage regulator; wherein the switch is controlled by the processor.

20. The terminal of claim 9, further comprising an operating voltage supply unit adapted to convert an RF signal received via the RF transceiver into an operating voltage.

21. An electronic terminal according to claim 9, further comprising:
   a diode connected between said transceiver and said circuit for storing said new encryption key;
   a capacitor within said circuit for storing connected to said diode; and
   an output from said transceiver connected to said diode and charging said capacitor until the timing controls trigger said switch.

22. An electronic terminal according to claim 21, further comprising a voltage regulator determining if said capacitor provides an acceptable programming voltage to send to said memory.

23. An electronic terminal according to claim 22, wherein said transceiver output and said acceptable programming voltage are coordinated by said timing controls to prevent an unacceptable programming voltage from said memory.

24. An electronic terminal comprising:
   at least one memory comprising a secure memory for storing at least one encryption key;
   a processor;
   an RF transceiver;
   a switch activated by the processor pursuant to pre-programmed time controls, said switch providing a circuit for storing a new encryption key in said secure memory;

a programming voltage supply unit adapted to convert an RF signal received via the RF transceiver into a programming voltage to thereby enable the secure memory to store said new encryption key received via the RF transceiver.

25. An electronic terminal according to claim 24, further comprising a voltage regulator connected between said RF transceiver and said switch.

26. An electronic terminal according to claim 24, wherein said programming voltage supply unit further comprises at least one capacitor connected to a voltage regulator.

27. An electronic terminal comprising:
   at least one memory comprising a secure memory for storing at least one encryption key and a read only memory for storing an authorization code;
   a processor;
   an RF transceiver;
   a switch activated by the processor pursuant to pre-programmed time controls, said switch connecting said processor to a circuit for storing a new encryption key in said secure memory;
   an operating voltage supply unit adapted to convert an RF signal received via the RF transceiver into an operating voltage to thereby enable the secure memory to store said new encryption key received via the RF transceiver.

28. An electronic terminal according to claim 27 further comprising a programming voltage supply unit adapted to convert an RF signal received via the RF transceiver into a programming voltage to thereby enable the secure memory to store said new encryption key received via the RF transceiver.

29. An electronic terminal according to claim 27, further comprising a voltage regulator connected between said RF transceiver and said switch.

30. An electronic terminal according to claim 27, wherein said programming voltage supply unit further comprises at least one capacitor connected to a voltage regulator.

31. An electronic terminal according to claim 27, wherein said voltage regulator determines if said capacitor provides an acceptable programming voltage to send to said memory.

* * * * *